United States Patent

Uchida

(10) Patent No.: US 6,881,239 B2
(45) Date of Patent: Apr. 19, 2005

(54) ULTRAFINE METAL POWDER SLURRY WITH HIGH DISPERSIBILITY

(75) Inventor: Morishige Uchida, Chiba (JP)

(73) Assignee: Kawatetsu Mining Co., Ltd., Tokyo (JP)

( * ) Notice: Subject to any disclaimer, the term of this patent is extended or adjusted under 35 U.S.C. 154(b) by 1 day.

(21) Appl. No.: 10/318,147

(22) Filed: Dec. 13, 2002

(65) Prior Publication Data

US 2003/0145680 A1 Aug. 7, 2003

(30) Foreign Application Priority Data

Dec. 21, 2001 (JP) ........................................ 2001-389998
Sep. 11, 2002 (JP) ........................................ 2002-265835
Nov. 21, 2002 (JP) ........................................ 2002-338014

(51) Int. Cl.$^7$ ................................................ B22F 1/00
(52) U.S. Cl. ........................ 75/252; 252/513; 252/514; 252/515
(58) Field of Search .................... 75/252; 252/513–515; 419/40

(56) References Cited

U.S. PATENT DOCUMENTS

| | | | | |
|---|---|---|---|---|
| 4,752,528 A | * | 6/1988 | Oka ........................... | 428/403 |
| 4,894,746 A | * | 1/1990 | Mori et al. ................ | 361/275.4 |
| 4,904,411 A | * | 2/1990 | Novich et al. ................ | 516/33 |
| 4,978,643 A | * | 12/1990 | Venkataswamy et al. ..... | 419/40 |
| 5,047,182 A | * | 9/1991 | Sundback et al. ............ | 264/28 |
| 5,268,233 A | * | 12/1993 | Heller et al. ................ | 428/523 |
| 5,422,193 A | * | 6/1995 | Nakamura et al. .... | 428/694 BG |
| 5,618,637 A | * | 4/1997 | Tamai et al. ............ | 428/694 B |
| 6,541,443 B1 | * | 4/2003 | Rojo .......................... | 510/512 |
| 6,592,645 B1 | * | 7/2003 | Mizutani et al. .............. | 75/365 |
| 6,620,220 B1 | * | 9/2003 | Ito et al. ....................... | 75/362 |

FOREIGN PATENT DOCUMENTS

| | | |
|---|---|---|
| EP | 1 025 937 A1 | 8/2000 |
| EP | 1 195 773 A1 | 4/2002 |
| WO | WO 01/57885 A1 | 1/2001 |

* cited by examiner

*Primary Examiner*—Ngoclan T. Mai
(74) *Attorney, Agent, or Firm*—Oliff & Berridge, PLC

(57) ABSTRACT

An ultrafine metal powder slurry with high dispersibility includes an organic solvent; a surfactant having a hydrophilic group and a lipophilic group; and an ultrafine metal powder in an amount more than 60% by mass and less than 95% by mass. In the slurry, the hydrophilic group of the surfactant is at least one selected from a sulfonato group, sulfo group, sulfonyldioxy group, polyoxyethylene group with carboxyl group, and polyoxyethylene group with phosphate group, and the lipophilic group is an alkyl containing 12 or more carbon atoms or an alkylphenyl. The ultrafine metal powder slurry includes no aggregated particles, exhibits good dispersibility and is useful as a metal material for conductive pastes. The slurry can save a part of process steps in conventional conductive paste production processes, can shorten a process time and can save in labor.

11 Claims, 2 Drawing Sheets

ULTRAFINE METAL POWDER SLURRY WITH HIGH DISPERSIBILITY

BACKGROUND OF THE INVENTION

1. Field of the Invention

The present invention relates to ultrafine metal powder slurry with high dispersibility, which may be used as, for example, conductive paste fillers or internal electrodes of multilayer ceramic capacitors.

2. Description of the Related Art

Ultrafine metal powders for use in internal electrodes of multilayer ceramic capacitors are high-purity metal powders having a mean particle diameter of, for example, 0.1 to 1.0 $\mu$m and having a substantially spherical shape. Such an ultrafine metal powder is mixed with a binder such as an organic resin and thereby yields a paste. A thin film of the paste is applied to a ceramic green sheet by, for example, screen printing to form an internal electrode layer. Several hundreds of plies of the ceramic green sheet with the applied paste thin film are stacked and thereby yield a laminated composite. The laminated composite is subjected to a binder burn out process, a sintering process, and a firing process and thereby yields a multilayer ceramic capacitor. The mean particle size used herein means a mean surface diameter (D3) in a number-based particle size distribution.

To yield downsized and high-capacity multilayer ceramic capacitors, several hundreds to thousand plies of a ceramic green sheet with an internal electrode layer must be stacked. To accomplish this technology, the thickness of the internal electrode layer must be reduced from 3 $\mu$m in conventional equivalents to 1.5 $\mu$m or less.

If the ultrafine metal powder has poor dispersibility and thereby yields aggregates such as clumps, the aggregates penetrate the ceramic sheet layer and thereby lead to defective units with short-circuit of electrodes. Even if there are no penetrating aggregates, distances between the electrodes decrease to cause local current crowding to thereby shorten the life of the multilayer ceramic capacitor.

Such ultrafine metal powders have conventionally been produced by chemical vapor deposition (CVD), in which the prepared metal powder is subjected to a wet washing process in water for purification to yield a metal-water slurry, and the metal-water slurry is subjected to a drying process to yield a dried powder. These processes inevitably cause aggregated particles. Accordingly, the dried powder is not sufficiently dispersed in an organic solvent in a paste preparation process step 20 shown in FIG. 2. Accordingly, the dried powder is further subjected to a dispersing process step 25 including several dispersion treatments such as ball mill dispersion, ultrasonic dispersion, and roll mill dispersion in combination. However, the ultrafine metal powder having been subjected to the drying process tends to aggregate and has poor dispersibility also in the dispersing process step 25. These dispersion processes using a conventional dried powder can only yield a paste comprising an ultrafine metal powder in a content of at most about 50% by mass.

FIG. 2 shows the conventional process 20 for the making paste preparation of an ultrafine metal powder. In a metal powder purification process step 21, the metal powder is purified by removing a remainder material metal chloride and thereby yields a metal-water slurry (metal-water mixture). The metal-water slurry is dried in a metal powder drying process step 22 and thereby yields a product ultrafine metal powder, i.e., a dried powder 23. In the drying process step 22, aggregated particles are formed due to dry aggregation caused by liquid bridging force and van der Waals force acting among particles.

Aggregation also occurs in the subsequent process step 24 for dispersing the dried powder in an organic solvent. In the drying process step 22, metal hydroxides are formed on a surface of the ultrafine metal powder and thereby the resulting ultrafine metal powder has insufficient wettability (lipophilic property) to organic solvents. Accordingly, particles of the ultrafine metal powder having poor wettability to the organic solvents aggregate with one another in the dispersing process step 24 for dispersing the dried powder in an organic solvent.

The dried powder 23 is supplied to a user. On the user side, the dried powder 23 is subjected to the dispersing process step 24 in an organic solvent, is further treated via a viscosity adjustment process step 27 and thereby yields a paste. To disaggregate aggregated particles formed in the drying process step 22 and in the dispersing process step 24, the process further requires complicated treatments including dispersing process step 25 including, for example, ball mill dispersion, ultrasonic dispersion, and roll mill dispersion in combination and a filtrating process step 26. The process thereby requires much time and effort. Accordingly, although the dried powder 23 of the ultrafine metal powder as a product is required to include no aggregated particles and have high dispersibility, no conventional ultrafine metal powder slurry satisfy these requirements.

In addition, when the dried powder 23 supplied to the user is taken out from a package and is treated in the air for the above complicated treatments, an operator exposes oneself to jeopardy to inhale metal dust.

SUMMARY OF THE INVENTION

To solve the above problems, the present invention provides an ultrafine metal powder slurry with high dispersibility, including an organic solvent; a surfactant having a hydrophilic group and a lipophilic group; and an ultrafine metal powder in an amount more than 60% by mass and less than 95% by mass based on the total mass of the slurry, in which the hydrophilic group of the surfactant is at least one selected from sulfonato group, sulfo group, sulfonyldioxy group, polyoxyethylene group with carboxyl group, and polyoxyethylene group with phosphate group, and the lipophilic group of the surfactant is an alkyl containing 12 or more carbon atoms or an alkylphenyl.

The present invention can prevent aggregation of ultrafine particles and can provide a metallic material for conductive pastes, which includes no aggregated particles and has high dispersibility. In addition, the present invention can save a part of process steps in the conventional process for the preparation of conductive pastes, can shorten the process time and can reduce labor.

BRIEF DESCRIPTION OF THE DRAWINGS

The above-described and further objects, features and advantages of the present invention will become apparent from the following description of the preferred embodiments with reference to the attached drawings, in which.

DESCRIPTION OF THE PREFERRED EMBODIMENTS

Figure 1:
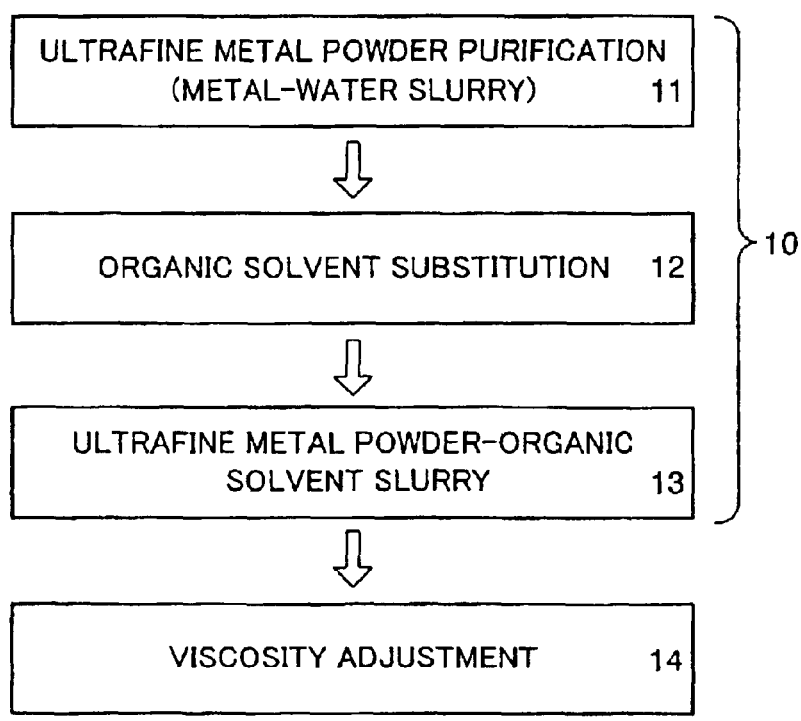
FIG. 1 is a flow chart of a preparation process according to the present invention.

The ultrafine metal powder slurry of the present invention is preferable as a metallic material for conductive pastes and is used in an internal electrode of multilayer ceramic capacitors.

Conventional slurry comprising an ultrafine metal powder, an organic solvent, and a surfactant is an intermediate in production processes for pastes and contains the ultrafine metal powder in a content of at most 50% by mass. For the production of conductive pastes, slurry containing the ultrafine metal powder in a larger amount is preferred. However, such a slurry containing the ultrafine metal powder in a larger amount inevitably includes aggregates of the ultrafine metal powder and has poor dispersibility even after undergoing complicated dispersion treatments. If the slurry including aggregates is used as a metallic material for conductive pastes in the production of ceramic capacitors, the resulting ceramic capacitors cannot have satisfactory properties.

A metal slurry containing an ultrafine metal powder in a content more than 60% by mass and less than 95% by mass has not been obtained according to conventional technologies and is first obtained according to the present invention. In the slurry of the present invention, the ultrafine metal powder is dispersed in an organic solvent as substantially primary particles without aggregation.

The content of the ultrafine metal powder can be controlled by controlling the amount of the organic solvent. If the content of the ultrafine metal powder is less than 95% by mass, the organic solvent is insufficient in amount so as to be adsorbed by the ultrafine metal powder to form an organic solvent layer. Thus, aggregates of the ultrafine metal powder are suppressed to locally form to deteriorate the dispersibility of the slurry.

The ultrafine metal powder as a material for internal electrode layers preferably has a particle size distribution as small as possible. The present inventors have found that, when the ultrafine metal powder in the slurry has a particle size distribution in terms of D90 of less than 1.2 $\mu$m, the slurry has high dispersibility and can yield dense and smooth electrode layers to thereby yield satisfactory ceramic capacitors. "D90" in the present invention is defined as follows. First, a sample ultrafine metal powder slurry in an organic solvent is measured using a laser particle size analyzer. Then, the obtained result is associated with the particle size distribution based on the number of particles, and the value corresponding to the 90/100th-particle size in ascending order in the particle size distribution of the number is determined as D90. Such a laser particle size analyzer is generally used for analysis of dispersion of metal particles in an organic solvent.

Preferred ultrafine metal powders for use in the present invention are high-purity metal powders having a mean particle size of, for example, 0.1 to 1.0 $\mu$m and having a substantially spherical shape. These material metal powders are preferably prepared by chemical vapor deposition in which, for example, a metal chloride is vaporized and is then reduced with $H_2$ to yield a metal powder.

The amount of the surfactant is preferably more than 0.05% by mass and less than 2% by mass relative to the ultrafine metal powder. The surfactant in the present invention plays the following roles. The surfactant is adsorbed by the entire surfaces of the ultrafine metal powder particles in the water slurry to thereby form a surfactant-adsorbed layer on the surfaces of the ultrafine metal powder particles in such a manner that a lipophilic functional group faces outside. The lipophilic functional group serves to transfer the ultrafine metal powder from water into the organic solvent to thereby exchange or replace the solvent. In addition, the surfactant improves the dispersibility of the ultrafine metal powder in the organic solvent. Accordingly, the surfactant is preferably contained in such a content as to be uniformly adsorbed by the entire surfaces of the ultrafine metal powder particles. The amount of the surfactant is preferably more than 0.05% by mass and less than 2% by mass relative to the ultrafine metal powder. If the amount is more than 0.05% by mass, the surfactant can be sufficiently adsorbed by the entire surfaces of the ultrafine metal powder particles and can be sufficiently transferred into the organic solvent. If it is less than 2% by mass, the amount is such a sufficient amount as to be uniformly adsorbed by the entire surface of the ultrafine metal powder particles and results in cost effectiveness.

The hydrophilic group of the surfactant is preferably at least one selected from a sulfonato group, sulfo group, sulfonyldioxy group, polyoxyethylene group with carboxyl group, and polyoxyethylene group with phosphate group. The lipophilic group of the surfactant is preferably an alkyl containing 12 or more carbon atoms or an alkylphenyl. More specifically, the surfactant is preferably at least one selected from polyoxyethylene lauryl ether carboxylic acids, carboxylated polyoxyethylene alkyl ethers, lauryl sulfates, polyoxyethylene alkyl phenyl ether phosphates, alkylbenzenesulfonic acids, and alkylbenzenesulfonic acid salts. A combination use of a polyoxyethylene alkyl phenyl ether phosphate with a polyoxyethylene alkyl phenyl ether further improves the dispersibility and facilitates the solvent substitution by a synergistic effect.

As a hydrophilic group to be effectively adsorbed by the ultrafine metal powder in water, the surfactant preferably comprises at least one selected from a sulfonato group, sulfo group, sulfonyldioxy group, polyoxyethylene group in combination with carboxyl group, and polyoxyethylene group in combination with phosphate group. As a lipophilic group to transfer the ultrafine metal powder adsorbing the surfactant into an organic solvent, alkyl each containing 12 or more carbon atoms and alkylphenyl are found to be effective. Such alkyl each containing 12 or more carbon atoms and alkylphenyl as the lipophilic group are also found to improve the dispersibility of the ultrafine metal powder in the organic solvent.

Cations constituting lauryl sulfates and alkylbenzesulfonic acid salts for use in the present invention may be any of Na, Mg, K, Ca, ammonium, and amine cations. For use in an internal electrode of multilayer ceramic capacitors, amines are preferred as the cation, since a metal, if any, remained in the internal electrode layer may adversely affect the electrical properties of the capacitors. Such amines include, but are not limited to, trimethylamine, triethylamine, tributylamine, and triethanolamine. Organic solvents for use herein are not specifically limited. Among them, terpene alcohols, glycols, carbitols (diethylene glycol ethyl ether and derivatives thereof), and aliphatic hydrocarbons generally used as solvents for conductive pastes are preferred.

Figure 2:
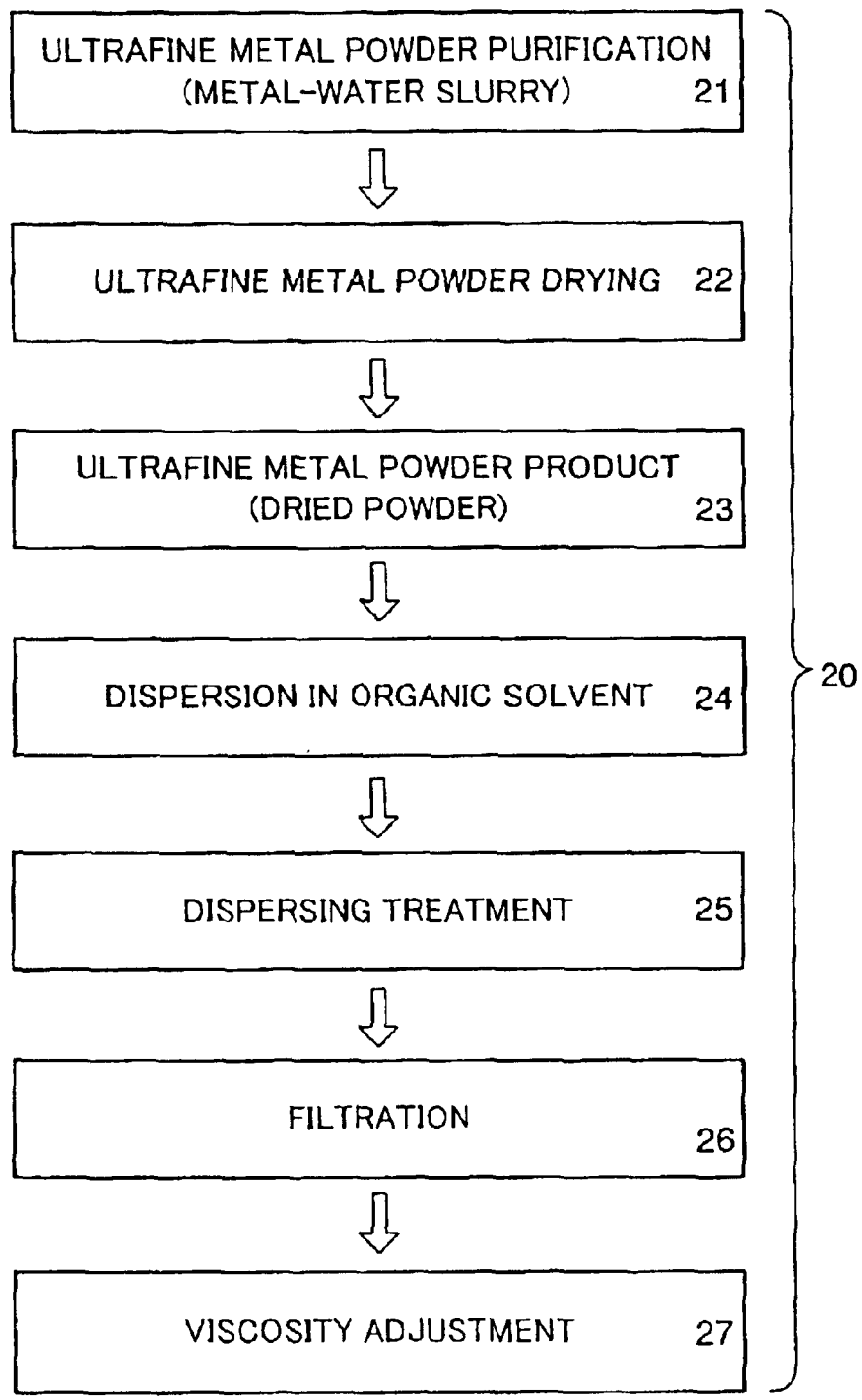
FIG. 2 is a flow chart of a conventional preparation process.

Several embodiments of the present invention will be illustrated in detail with reference to the attached drawings. FIG. 1 is a flow chart illustrating a process for the preparation of an ultrafine metal powder slurry with high dispersibility according to the present invention. A process step 11 of the purification of ultrafine metal powder (metal-water slurry) is corresponding to the process step 21 of the purification of ultrafine metal powder in the conventional process 20 in FIG. 2.

In the slurry preparation process 10 according to the present invention, the metal-water slurry is then subjected to an organic solvent substitution process step 12 without the metal powder drying process step 22 as in the conventional process 20. In the process step 12, water in the metal-water slurry is directly replaced with an organic solvent. Initially, the ultrafine metal powder-water slurry (concentration: 50% by mass) is subjected to mixing and agitation using, for example, a process homogenizer to thereby disperse aggregates of the ultrafine metal powder in water to primary particles.

A surfactant and terpineol as an organic solvent are then added to the slurry in amounts of 0.5% by mass and 10% by mass, respectively, relative to the ultrafine metal powder. The resulting mixture is further mixed at a temperature of 15° C.±5° C. for a set time period using, for example, a process homogenizer. Thus, terpineol is adsorbed by the surfactant adsorbed by the surface of the ultrafine metal powder and thereby forms a terpineol layer. Thus, terpineol substitutes for water surrounding the ultrafine metal powder.

When the terpineol layer surrounding the ultrafine metal powder becomes a continuous phase, the solvent exchange procedure completes. The resulting ultrafine metal powder-terpineol slurry comprising the ultrafine metal powder, terpineol, and the surfactant forms into a precipitate in water. The substituted water is separated as a supernatant fluid and is drained, thus yielding an ultrafine metal powder-terpineol slurry (ultrafine metal powder-organic solvent slurry 13) having an ultrafine metal powder content of 90% by mass.

The ultrafine metal powder-organic solvent slurry 13 has not undergo a drying process step and contains substantially no aggregated particles, which is distinguished from conventional art. By adjusting the amount of the organic solvent, the resulting slurry can have an ultrafine metal powder content of more than 60% by mass and less than 95% by mass. The ultrafine metal powder-organic solvent slurry 13 can be supplied as intact as a metallic material for conductive pastes. A conductive paste can be obtained by adding a necessary amount of a binder resin solution to the ultrafine metal powder-organic solvent slurry 13 in a viscosity adjustment process step 14 in the production of a conductive paste in the user side. Accordingly, complicated treatments such as dispersion treatments and filtration in the conventional process can be omitted. As a binder resin, ethyl cellulose is generally used.

The present invention can switch the conductive paste material from the conventional dried powder 23 to the ultrafine metal powder-organic solvent slurry 13, can thereby eliminate the risk of dust derived from the dried powder and can improve the working environment.

EXAMPLES

The present invention will be illustrated in further detail with reference to several examples and comparative examples below, which are not intended to limit the scope of the invention.

Example 1

A high-purity ultrafine nickel powder having a mean particle size of 0.4 μm with a substantially spherical shape was prepared by chemical vapor deposition. The ultrafine nickel powder was subjected to the ultrafine metal powder purification process step 11 and thereby yielded 10 L of an ultrafine nickel powder-water slurry (concentration: 50% by mass). The water slurry was subjected to a pretreatment by mixing and agitating using a process homogenizer (available from SMT Co., Ltd.) at a blade rotation number of 8000 rpm for 30 minutes.

The pretreated water slurry was further mixed with polyoxyethylene lauryl ether acetate having a lipophilic group containing 12 carbon atoms (available from Nikko Chemicals Co., Ltd. under the trade name of RLM-45) as a surfactant in an amount of 0.5% by mass relative to the ultrafine nickel powder and terpineol (available from Yasuhara Chemical Co., Ltd.) as an organic solvent in an amount of 10% by mass relative to the ultrafine nickel powder. The resulting mixture was further blended using a process homogenizer (available from SMT Co., Ltd.) at a temperature of 15° C.±5° C. at a blade rotation number of 3000 rpm for 30 minutes. In this procedure, terpineol substituted for water surrounding the ultrafine nickel powder and thereby yielded an ultrafine nickel powder-terpineol slurry as a precipitate in water.

The separated supernatant fluid was drained to thereby yield an ultrafine nickel powder-terpineol slurry comprising the ultrafine nickel powder, terpineol, and the surfactant and having an ultrafine nickel powder content of 90% by mass.

The particle size distribution of the ultrafine nickel powder-terpineol slurry was determined using a laser particle size analyzer under the following conditions:

Analyzer: Laser diffraction particle size analyzer (available from Shimadzu Corporation; Model SALD-2100)

Analysis conditions:
Sample mass: 30.00 to 36.00 mg
Dispersion medium: Terpineol 100 ml
Pre-dispersion: Ultrasonic homogenizer (available from Nihon Seiki Seisakusho Co., Ltd.; Model US-600)
Pre-dispersion time: 5 min.

The pre-dispersed solution was charged to the analyzer to reach a sufficient absorbance to measure. The dispersibility was determined in terms of D90 (90% diameter) in a particle size distribution. The lower D90 is, the higher the dispersibility is.

Based on D90, the dispersibility was determined according to the following criteria:

Very poor: D90 was equal to or more than 2.0 μm
Poor: D90 was equal to or more than 1.5 μm and less than 2.0 μm
Fair: D90 was equal to or more than 1.2 μm and less than 1.5 μm
Good: D90 was less than 1.2 μm The solvent substitution was determined according to the following criteria:

Good: Complete exchange
Fair: Insufficient exchange (metal powder floated in the supernatant fluid)
Poor: Poor exchange (no metal-organic solvent slurry formed)

Example 2

An ultrafine nickel powder-terpineol slurry was prepared by the same procedure of Example 1, except that the polyoxyethylene lauryl ether acetate having a lipophilic group containing 12 carbon atoms (available from Nikko Chemicals Co., Ltd. under the trade name of RLM-45) as the surfactant was used in an amount of 0.1% by mass relative to the ultrafine nickel powder.

Example 3

An ultrafine nickel powder-terpineol slurry was prepared by the same procedure of Example 1, except that the polyoxyethylene lauryl ether acetate having a lipophilic group containing 12 carbon atoms (available from Nikko Chemicals Co., Ltd. under the trade name of RLM-45) as the surfactant was used in an amount of 1.0% by mass relative to the ultrafine nickel powder.

Example 4

An ultrafine nickel powder-terpineol slurry was prepared by the same procedure of Example 1, except that the polyoxyethylene lauryl ether acetate having a lipophilic group containing 12 carbon atoms (available from Nikko Chemicals Co., Ltd. under the trade name of RLM-45) as the surfactant was used in an amount of 2.0% by mass relative to the ultrafine nickel powder.

Example 5

An ultrafine nickel powder-terpineol slurry was prepared by the same procedure of Example 1, except that the polyoxyethylene lauryl ether acetate having a lipophilic group containing 12 carbon atoms (available from Nikko Chemicals Co., Ltd. under the trade name of RLM-45) as the surfactant was used in an amount of 0.04% by mass relative to the ultrafine nickel powder.

Example 6

An ultrafine nickel powder-terpineol slurry was prepared by the same procedure of Example 1, except that the polyoxyethylene lauryl ether acetate having a lipophilic group containing 12 carbon atoms (available from Nikko Chemicals Co., Ltd. under the trade name of RLM-45) as the surfactant was used in an amount of 0.01% by mass relative to the ultrafine nickel powder.

Example 7

An ultrafine nickel powder-terpineol slurry was prepared by the same procedure of Example 1, except that the amount of terpineol was changed to 25% by mass. The resulting slurry had an ultrafine nickel powder content of 80% by mass.

Example 8

An ultrafine nickel powder-terpineol slurry was prepared by the same procedure of Example 1, except that the amount of terpineol was changed to 6% by mass. The resulting slurry had an ultrafine nickel powder content of 94% by mass.

Example 9

An ultrafine nickel powder-terpineol slurry was prepared by the same procedure of Example 1, except that the amount of terpineol was changed to 42% by mass. The resulting slurry had an ultrafine nickel powder content of 70% by mass.

Example 10

An ultrafine nickel powder-terpineol slurry was prepared by the same procedure of Example 1, except that the amount of terpineol was changed to 65% by mass. The resulting slurry had an ultrafine nickel powder content of 61% by mass.

Example 11

An ultrafine nickel powder-terpineol slurry was prepared by the same procedure of Example 1, except that a carboxylated polyoxyethylene alkyl ether with a lipophilic group having an alkyl containing 13 carbon atoms (available from Nikko Chemicals Co., Ltd. under the trade name of ECT-7) was used as the surfactant.

Example 12

An ultrafine nickel powder-terpineol slurry was prepared by the same procedure of Example 1, except that triethanolamine lauryl sulfate with a lipophilic group having an alkyl containing 15 carbon atoms (available from Kao Corporation under the trade name of EMAL TD) was used as the surfactant.

Example 13

An ultrafine nickel powder-terpineol slurry was prepared by the same procedure of Example 1, except that a polyoxyethylene alkyl phenyl ether phosphate having an alkylphenyl as a lipophilic group (available from Nikko Chemicals Co., Ltd. under the trade name of DNPP-4) was used as the surfactant.

Example 14

An ultrafine nickel powder-terpineol slurry was prepared by the same procedure of Example 1, except that a polyoxyethylene alkyl phenyl ether phosphate having an alkylphenyl as a lipophilic group (available from Nikko Chemicals Co., Ltd. under the trade name of DNPP-4) and a polyoxyethylene alkyl phenyl ether having an alkylphenyl as a lipophilic group (available from Nikko Chemicals Co., Ltd. under the trade name of NP-7.5) were used as the surfactant in amounts of 0.4% by mass and 0.1% by mass, respectively, relative to the ultrafine nickel powder.

Example 15

An ultrafine nickel powder-ethylene glycol slurry was prepared by the same procedure of Example 1, except that ethylene glycol was used as the organic solvent.

Example 16

An ultrafine nickel powder-ethyl carbitol slurry was prepared by the same procedure of Example 1, except that ethyl carbitol (diethylene glycol monoethyl ether) was used as the organic solvent.

Example 17

An ultrafine nickel powder-n-dodecane slurry was prepared by the same procedure of Example 1, except that n-dodecane (n-$C_{12}H_{27}$; an aliphatic hydrocarbon) was used as the organic solvent.

Example 18

An ultrafine nickel powder-terpineol slurry was prepared by the same procedure of Example 1, except that an alkylbenzenesulfonic acid with a lipophilic group having an alkyl containing 12 to 15 carbon atoms (available from Lion Corporation under the trade name of Lipon LH-200) was used as the surfactant in an amount of 0.2% by mass relative to the ultrafine nickel powder.

Example 19

An ultrafine Cu powder-terpineol slurry was prepared by the same procedure of Example 1, except that an ultrafine Cu powder was used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu powder.

Example 20

An ultrafine Ag powder-terpineol slurry is prepared by the same procedure of Example 1, except that an ultrafine Ag powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ag powder.

Example 21

An ultrafine Mo powder-terpineol slurry is prepared by the same procedure of Example 1, except that an ultrafine Mo powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Mo powder.

Example 22

An ultrafine W powder-terpineol slurry is prepared by the same procedure of Example 1, except that an ultrafine W powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine W powder.

Example 23

An ultrafine Co powder-terpineol slurry is prepared by the same procedure of Example 1, except that an ultrafine Co powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Co powder.

Example 24

An ultrafine Ta powder-terpineol slurry is prepared by the same procedure of Example 1, except that an ultrafine Ta powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ta powder.

Example 25

An ultrafine Ni—V alloy powder-terpineol slurry is prepared by the same procedure of Example 1, except that an ultrafine Ni—V alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—V alloy powder.

Example 26

An ultrafine Ni—Cr alloy powder-terpineol slurry is prepared by the same procedure of Example 1, except that an ultrafine Ni—Cr alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Cr alloy powder.

Example 27

An ultrafine Ni—Nb alloy powder-terpineol slurry is prepared by the same procedure of Example 1, except that an ultrafine Ni—Nb alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Nb alloy powder.

Example 28

An ultrafine Ni—Mo alloy powder-terpineol slurry is prepared by the same procedure of Example 1, except that an ultrafine Ni—Mo alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Mo alloy powder.

Example 29

An ultrafine Ni—Ta alloy powder-terpineol slurry is prepared by the same procedure of Example 1, except that an ultrafine Ni—Ta alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Ta alloy powder.

Example 30

An ultrafine Ni—W alloy powder-terpineol slurry is prepared by the same procedure of Example 1, except that an ultrafine Ni—W alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—W alloy powder.

Example 31

An ultrafine Ni—Zr alloy powder-terpineol slurry is prepared by the same procedure of Example 1, except that an ultrafine Ni—Zr alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Zr alloy powder.

Example 32

An ultrafine Ni—Y alloy powder-terpineol slurry is prepared by the same procedure of Example 1, except that an ultrafine Ni—Y alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Y alloy powder.

Example 33

An ultrafine Ni—La alloy powder-terpineol slurry is prepared by the same procedure of Example 1, except that an ultrafine Ni—La alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—La alloy powder.

Example 34

An ultrafine Ni—Mg alloy powder-terpineol slurry is prepared by the same procedure of Example 1, except that an ultrafine Ni—Mg alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Mg alloy powder.

Example 35

An ultrafine Ni—Ti alloy powder-terpineol slurry is prepared by the same procedure of Example 1, except that an ultrafine Ni—Ti alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Ti alloy powder.

Example 36

An ultrafine Ni—Ba alloy powder-terpineol slurry is prepared by the same procedure of Example 1, except that an ultrafine Ni—Ba alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Ba alloy powder.

Example 37

An ultrafine Ni—Ca alloy powder-terpineol slurry is prepared by the same procedure of Example 1, except that an ultrafine Ni—Ca alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Ca alloy powder.

Example 38

An ultrafine Ni—W—Ca alloy powder-terpineol slurry is prepared by the same procedure of Example 1, except that an ultrafine Ni—W—Ca alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—W—Ca alloy powder.

Example 39

An ultrafine Ni—Mg—Zr alloy powder-terpineol slurry is prepared by the same procedure of Example 1, except that an ultrafine Ni—Mg—Zr alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Mg—Zr alloy powder.

Example 40

An ultrafine Ni—Mo—Mn alloy powder-terpineol slurry is prepared by the same procedure of Example 1, except that an ultrafine Ni—Mo—Mn alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Ni—Mo—Mn alloy powder.

Example 41

An ultrafine Cu—V alloy powder-terpineol slurry is prepared by the same procedure of Example 1, except that an ultrafine Cu—V alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—V alloy powder.

Example 42

An ultrafine Cu—Cr alloy powder-terpineol slurry is prepared by the same procedure of Example 1, except that an ultrafine Cu—Cr alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—Cr alloy powder.

Example 43

An ultrafine Cu—Nb alloy powder-terpineol slurry is prepared by the same procedure of Example 1, except that an ultrafine Cu—Nb alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—Nb alloy powder.

Example 44

An ultrafine Cu—Mo alloy powder-terpineol slurry is prepared by the same procedure of Example 1, except that an ultrafine Cu—Mo alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—Mo alloy powder.

Example 45

An ultrafine Cu—Ta alloy powder-terpineol slurry is prepared by the same procedure of Example 1, except that an ultrafine Cu—Ta alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—Ta alloy powder.

Example 46

An ultrafine Cu—W alloy powder-terpineol slurry is prepared by the same procedure of Example 1, except that an ultrafine Cu—W alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—W alloy powder.

Example 47

An ultrafine Cu—Zr alloy powder-terpineol slurry is prepared by the same procedure of Example 1, except that an ultrafine Cu—Zr alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—Zr alloy powder.

Example 48

An ultrafine Cu—Y alloy powder-terpineol slurry is prepared by the same procedure of Example 1, except that an ultrafine Cu—Y alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—Y alloy powder.

Example 49

An ultrafine Cu—La alloy powder-terpineol slurry is prepared by the same procedure of Example 1, except that an ultrafine Cu—La alloy powder was used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—La alloy powder.

Example 50

An ultrafine Cu—Mg alloy powder-terpineol slurry is prepared by the same procedure of Example 1, except that an ultrafine Cu—Mg alloy powder is used as the ultrafine metal powder and that an alkylbenzenesulfonic acid with a lipophilic group having an alkyl containing 12 to 15 carbon atoms (available from Lion Corporation under the trade name of Lipon LH-200) is used as the surfactant in an amount of 0.2% by mass relative to the ultrafine Cu—Mg alloy powder.

Comparative Example 1

An ultrafine nickel powder-terpineol slurry was prepared by the process steps (the process steps 21, 22, 23, and 24 in FIG. 2) of the conventional paste intermediate preparation process 20. In this procedure, a high-purity ultrafine nickel powder prepared by chemical vapor deposition having a mean particle size of 0.4 $\mu$m and having a substantially spherical shape was used. To 1000 g of the ultrafine nickel powder product (dried powder), 100% by mass of terpineol (available from Yasuhara Chemical Co., Ltd.) was added to yield a mixture having an ultrafine nickel powder content of 50% by mass. A surfactant was added to the mixture in an amount of 0.5% by mass relative to the ultrafine nickel powder. The resulting mixture was subjected to a dispersion operation for 1 hour using a cake mixer and thereby yielded an ultrafine nickel powder-terpineol slurry. The product slurry corresponds to a product after the completion of the process step 24 of the conventional process 20 for dispersion in an organic solvent.

Comparative Example 2

An ultrafine nickel powder-terpineol slurry was prepared by the same procedure of Example 1, except that the amount of terpineol (available from Yasuhara Chemical Co., Ltd.) was changed to 3% by mass. The resulting slurry had an ultrafine nickel powder content of 97% by mass.

Comparative Example 3

An ultrafine nickel powder-terpineol slurry was prepared by the same procedure of Example 1, except that a polyoxyethylene alkyl ether with a lipophilic group having an alkyl containing 10 carbon atoms (available from Kao Corporation under the trade name of Emulgen 707) was used as the surfactant.

Comparative Example 4

An ultrafine nickel powder-terpineol slurry was prepared by the same procedure of Example 1, except that a sorbitan fatty acid ester having a sorbitan group as a hydrophilic group (available from Kao Corporation under the trade name of Rheodol SP-030) was used as the surfactant.

The physical properties of the slurries according to the examples and comparative examples are shown in Tables 1 and 2.

To verify that the slurries according to the present invention have good dispersibility as a conductive paste and that they can save in labor in a process for producing a conductive paste, a series of conductive pastes was prepared using the ultrafine nickel powder slurries according to the present invention.

Application Example 1

A conductive paste was prepared by adding 10 parts by weight of a binder resin solution containing terpineol and 12% by mass ethyl cellulose to 100 parts by weight of the ultrafine nickel powder-terpineol slurry obtained in Example 1 having an ultrafine nickel powder content of 90% by mass, mixing the mixture for 30 minutes using an agitator, and adjusting the viscosity of the mixture to an ultrafine nickel powder content of about 80% by mass.

Application Example 2

A conductive paste was prepared by the same procedure of Application Example 1, except that the ultrafine nickel powder-terpineol slurry obtained in Example 18 having an ultrafine nickel powder content of 90% by mass was used as the material.

Application Example 3

A conductive paste was prepared by the same procedure of Application Example 1, except that the ultrafine Cu powder-terpineol slurry obtained in Example 19 having an ultrafine Cu powder content of 90% by mass was used as the material.

Comparative Application Example 1

A conductive paste was prepared by adding 10 parts by weight of a binder resin solution containing terpineol and 12% by mass ethyl cellulose to 100 parts by weight of the ultrafine nickel powder-terpineol slurry obtained in Comparative Example 1 having an ultrafine nickel powder content of 50% by mass, mixing the mixture for 1 hour using an agitator, allowing the mixture to pass through a three-roll mill five times, filtrating the mixture using a cartridge filter-type pressure filter and adjusting the viscosity of the mixture to an ultrafine nickel powder content of about 45% by mass.

The dispersibility of the conductive pastes obtained in Application Examples 1 to 3 and Comparative Application Example 1 was determined in the following manner: A film of a sample conductive paste was applied to plate glass to a dry thickness from 1 to 2 $\mu$m by hand screen printing and was dried in a drying oven; and protrusions on a surface of the dried conductive paste film were counted. The dispersibility was rated by the number of protrusions per 1 square centimeter in the sample. The less the number of protrusions is, the higher the dispersibility is. The compositions and the rated dispersibility of the conductive pastes are shown in Table 3.

Tables 1 and 2 show that the ultrafine metal powder slurries of the present invention have a high metal content and exhibit excellent dispersibility. Table 3 shows that the ultrafine metal powder slurry of the present invention used as a material can save in labor in process steps and can yield conductive pastes having a high metal content and exhibiting high dispersibility.

The present invention can provide ultrafine metal powder slurries for use in conductive pastes, which have a significantly high ultrafine metal powder content and exhibit high dispersibility. They can save a part of process steps in the conventional conductive paste production process, can shorten a process time and can save in labor. The use of the ultrafine metal powder slurry eliminates the risk of inhalation of dust derived from a dried powder and thereby yields good working environment. Accordingly, the ultrafine metal powder slurries of the present invention have much significance in safety and sanitation.

TABLE 1

|  | Metal powder | Organic solvent | Surfactant | Hydrophilic group | Lipophilic group or carbon number of its alkyl | Amount of surfactant (mass %) | Metal content (mass %) | Dispersibility D90 | Solvent exchange |
|---|---|---|---|---|---|---|---|---|---|
| Ex. 1 | Ni | terpineol | polyoxyethylene lauryl ether acetate | polyoxyethylene group and carboxyl group | 12 | 0.5 | 90 | Good | Good |
| Ex. 2 | Ni | " | polyoxyethylene lauryl ether acetate | polyoxyethylene group and carboxyl group | 12 | 0.1 | 90 | Good | Good |
| Ex. 3 | Ni | " | polyoxyethylene lauryl ether acetate | polyoxyethylene group and carboxyl group | 12 | 1 | 90 | Good | Good |
| Ex. 4 | Ni | " | polyoxyethylene lauryl ether acetate | polyoxyethylene group and carboxyl group | 12 | 2 | 90 | Good | Good |
| Ex. 5 | Ni | " | polyoxyethylene lauryl ether acetate | polyoxyethylene group and carboxyl group | 12 | 0.04 | 90 | Fair | Fair |
| Ex. 6 | Ni | " | polyoxyethylene lauryl ether acetate | polyoxyethylene group and carboxyl group | 12 | 0.01 | 90 | Fair | Fair |
| Ex. 7 | Ni | " | polyoxyethylene lauryl ether acetate | polyoxyethylene group and carboxyl group | 12 | 0.5 | 80 | Good | Good |
| Ex. 8 | Ni | " | polyoxyethylene lauryl ether acetate | polyoxyethylene group and carboxyl group | 12 | 0.5 | 94 | Good | Good |
| Ex. 9 | Ni | " | polyoxyethylene lauryl ether acetate | polyoxyethylene group and carboxyl group | 12 | 0.5 | 70 | Good | Good |
| Ex. 10 | Ni | " | polyoxyethylene lauryl ether acetate | polyoxyethylene group and carboxyl group | 12 | 0.5 | 61 | Good | Good |

TABLE 1-continued

| | Metal powder | Organic solvent | Surfactant | Hydrophilic group | Lipophilic group or carbon number of its alkyl | Amount of surfactant (mass %) | Metal content (mass %) | Dispersibility D90 | Solvent exchange |
|---|---|---|---|---|---|---|---|---|---|
| Ex. 11 | Ni | " | carboxylated polyoxyethylene alkyl ether | polyoxyethylene group and carboxyl group | 13 | 0.5 | 90 | Good | Good |
| Ex. 12 | Ni | " | triethanolamine lauryl sulfate | sulfonyldioxy group | 15 | 0.5 | 90 | Good | Good |
| Ex. 13 | Ni | " | polyoxyethylene alkyl phenyl ether phosphate | polyoxyethylene group and phosphate group | alkylphenyl group | 0.5 | 90 | Good | Good |
| Ex. 14 | Ni | " | polyoxyethylene alkyl phenyl ether phosphate and polyoxyethylene alkyl phenyl ether | polyoxyethylene group and phosphate group | alkylphenyl group | 0.4 + 0.1 | 90 | Good | Good |
| Ex. 15 | Ni | ethylene glycol | polyoxyethylene lauryl ether acetate | polyoxyethylene group and carboxyl group | 12 | 0.5 | 90 | Good | Good |
| Ex. 16 | Ni | ethyl carbitol glycol | polyoxyethylene lauryl ether acetate | polyoxyethylene group and carboxyl group | 12 | 0.5 | 90 | Good | Good |
| Ex. 17 | Ni | n-dodecane | polyoxyethylene lauryl ether acetate | polyoxyethylene group and carboxyl group | 12 | 0.5 | 90 | Good | Good |
| Ex. 18 | Ni | terpineol | alkylbenzenesulfonic acid | sulfo group | 12–15 | 0.2 | 90 | Good | Good |
| Ex. 19 | Cu | " | alkylbenzenesulfonic acid | " | " | 0.2 | 90 | Good | Good |
| Ex. 20 | Ag | " | alkylbenzenesulfonic acid | " | " | 0.2 | 90 | Good | Good |
| Ex. 21 | Mo | " | alkylbenzenesulfonic acid | " | " | 0.2 | 90 | Good | Good |
| Ex. 22 | W | " | alkylbenzenesulfonic acid | " | " | 0.2 | 90 | Good | Good |
| Ex. 23 | Co | " | alkylbenzenesulfonic acid | " | " | 0.2 | 90 | Good | Good |
| Ex. 24 | Ta | " | alkylbenzenesulfonic acid | " | " | 0.2 | 90 | Good | Good |
| Ex. 25 | Ni—V | " | alkylbenzenesulfonic acid | " | " | 0.2 | 90 | Good | Good |
| Ex. 26 | Ni—Cr | " | alkylbenzenesulfonic acid | " | " | 0.2 | 90 | Good | Good |
| Ex. 27 | Ni—Nb | " | alkylbenzenesulfonic acid | " | " | 0.2 | 90 | Good | Good |
| Ex. 28 | Ni—Mo | " | alkylbenzenesulfonic acid | " | " | 0.2 | 90 | Good | Good |
| Ex. 29 | Ni—Ta | " | alkylbenzenesulfonic acid | " | " | 0.2 | 90 | Good | Good |
| Ex. 30 | Ni—W | " | alkylbenzenesulfonic acid | " | " | 0.2 | 90 | Good | Good |
| Ex. 31 | Ni—Zr | " | alkylbenzenesulfonic acid | " | " | 0.2 | 90 | Good | Good |
| Ex. 32 | Ni—Y | " | alkylbenzenesulfonic acid | " | " | 0.2 | 90 | Good | Good |
| Ex. 33 | Ni—La | " | alkylbenzenesulfonic acid | " | " | 0.2 | 90 | Good | Good |
| Ex. 34 | Ni—Mg | " | alkylbenzenesulfonic acid | " | " | 0.2 | 90 | Good | Good |
| Ex. 35 | Ni—Ti | " | alkylbenzenesulfonic acid | " | " | 0.2 | 90 | Good | Good |
| Ex. 36 | Ni—Ba | " | alkylbenzenesulfonic acid | " | " | 0.2 | 90 | Good | Good |
| Ex. 37 | Ni—Ca | " | alkylbenzenesulfonic acid | " | " | 0.2 | 90 | Good | Good |
| Ex. 38 | Ni—W—Ca | " | alkylbenzenesulfonic acid | " | " | 0.2 | 90 | Good | Good |
| Ex. 39 | Ni—Mg—Zr | " | alkylbenzenesulfonic acid | " | " | 0.2 | 90 | Good | Good |
| Ex. 40 | Ni—Mo—Mn | " | alkylbenzenesulfonic acid | " | " | 0.2 | 90 | Good | Good |
| Ex. 41 | Cu—V | " | alkylbenzenesulfonic acid | " | " | 0.2 | 90 | Good | Good |
| Ex. 42 | Cu—Cr | " | alkylbenzenesulfonic acid | " | " | 0.2 | 90 | Good | Good |
| Ex. 43 | Cu—Nb | " | alkylbenzenesulfonic acid | " | " | 0.2 | 90 | Good | Good |

TABLE 1-continued

|  | Metal powder | Organic solvent | Surfactant | Hydrophilic group | Lipophilic group or carbon number of its alkyl | Amount of surfactant (mass %) | Metal content (mass %) | Dispersibility D90 | Solvent exchange |
|---|---|---|---|---|---|---|---|---|---|
| Ex. 44 | Cu—Mo | " | alkylbenzenesulfonic acid | " | " | 0.2 | 90 | Good | Good |
| Ex. 45 | Cu—Ta | " | alkylbenzenesulfonic acid | " | " | 0.2 | 90 | Good | Good |
| Ex. 46 | Cu—W | " | alkylbenzenesulfonic acid | " | " | 0.2 | 90 | Good | Good |
| Ex. 47 | Cu—Zr | " | alkylbenzenesulfonic acid | " | " | 0.2 | 90 | Good | Good |
| Ex. 48 | Cu—Y | " | alkylbenzenesulfonic acid | " | " | 0.2 | 90 | Good | Good |
| Ex. 49 | Cu—La | " | alkylbenzenesulfonic acid | " | " | 0.2 | 90 | Good | Good |
| Ex. 50 | Cu—Mg | " | alkylbenzenesulfonic acid | " | " | 0.2 | 90 | Good | Good |

TABLE 2

|  | Metal powder | Organic solvent | Surfactant | Hydrophilic group | Lipophilic group or carbon number of its alkyl | Amount of surfactant (mass %) | Metal content (mass %) | Dispersibility D90 | Solvent Exchange |
|---|---|---|---|---|---|---|---|---|---|
| Com. Ex. 1 | Ni | terpineol | polyoxyethylene lauryl ether acetate | polyoxyethylene group and carboxyl group | 12 | 0.5 | 50 | Poor | — |
| Com. Ex. 2 | Ni | " | polyoxyethylene lauryl ether acetate | polyoxyethylene group and carboxyl group | 12 | 0.5 | 97 | Poor | Fair |
| Com. Ex. 3 | Ni | " | polyoxyethylene alkyl ether | polyoxyethylene group | 10 | 0.5 | 90 | Poor | Poor |
| Com. Ex. 4 | Ni | " | sorbitan fatty acid ester | sorbitan group | 17 | 0.5 | 90 | Poor | Poor |

TABLE 3

Composition of Conductive Paste (% by mass)

|  | Ultrafine metal powder | Organic solvent (terpineol) | Binder resin (ethyl cellulose) | Surfactant | Disbersibility (number of protrusions) |
|---|---|---|---|---|---|
| App. Ex. 1 | Ni 81.6 | 17.0 | 1.0 | 0.4 | 1 |
| App. Ex. 2 | Ni 82.5 | 16.3 | 1.0 | 0.2 | 1 |
| App. Ex. 3 | Cu 82.5 | 16.3 | 1.0 | 0.2 | 1 |
| Com. App. Ex. 1 | Ni 45.6 | 53 | 1.0 | 0.4 | 20 |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ultrafine metal powder slurry with high dispersibility, comprising:
    an organic solvent;
    a surfactant having a hydrophilic group and a lipophilic group; and
    an ultrafine metal powder in an amount more than 60% by mass and less than 95% by mass based on the mass of the slurry,
    wherein the hydrophilic group of the surfactant is at least one selected from the group consisting of sulfo group, sulfonyldioxy group, and polyoxyethylene group with carboxyl group,
    wherein the lipophilic group of the surfactant is an alkyl group containing 12 or more carbon atoms or an alkylphenyl, and
    wherein the surfactant is at least one selected from the group consisting of polyoxyethylene lauryl ether carboxylic acids.

2. The slurry according to claim 1, wherein the ultrafine metal powder has a particle size distribution D90 of less than 1.2 μm.

3. The slurry according to claim 1, wherein the amount of the surfactant is more than 0.05% by mass and less than 2% by mass relative to the ultrafine metal powder.

4. The slurry according to claim 2, wherein the amount of the surfactant is more than 0.05% by mass and less than 2% by mass relative to the ultrafine metal powder.

5. The slurry according to claim 1, wherein the surfactant is at least one selected from the group consisting of polyoxyethylene lauryl ether carboxylic acids.

6. The slurry according to claim 2, wherein the surfactant is at least one selected from the group consisting of polyoxyethylene lauryl ether carboxylic acids.

7. The slurry according to claim 3, wherein the surfactant is at least one selected from the group consisting of polyoxyethylene lauryl ether carboxylic acids.

8. The slurry according to claim 4, wherein the surfactant is at least one selected from the group consisting of polyoxyethylene lauryl ether carboxylic acids.

9. The slurry according to claim 1, wherein the ultrafine metal powder comprises at least one selected from the group consisting of nickel, copper, silver, molybdenum, tungsten, cobalt, and tantalum.

10. The slurry according to claim 1, wherein the ultrafine metal powder is an alloy powder comprising nickel and at least one element selected from the group consisting of V, Nb, Mo, Ta, W, Zr, Y, La, Mg, Ti, Ba, and Ca.

11. The slurry according to claim 1, wherein the ultrafine metal powder is an alloy powder comprising copper and at least one element selected from the group consisting of V, Cr, Nb, Mo, Ta, W, Zr, Y, La, Mg, Ti, Ba, and Ca.

* * * * *